United States Patent
Hata et al.

(10) Patent No.: US 7,560,910 B2
(45) Date of Patent: Jul. 14, 2009

(54) VOLTAGE CONVERTER AND SEMICONDUCTOR INTEGRATED CIRCUIT

(75) Inventors: Takehiro Hata, Tokyo (JP); Kazuyasu Minami, Tokyo (JP)

(73) Assignee: Renesas Technology Corp., Tokyo (JP)

( * ) Notice: Subject to any disclaimer, the term of this patent is extended or adjusted under 35 U.S.C. 154(b) by 135 days.

(21) Appl. No.: 11/898,204

(22) Filed: Sep. 10, 2007

(65) Prior Publication Data
US 2008/0258800 A1    Oct. 23, 2008

(30) Foreign Application Priority Data
Sep. 19, 2006    (JP)    ............................... 2006-252335

(51) Int. Cl.
*G05F 1/618* (2006.01)
*G05F 1/62* (2006.01)
(52) U.S. Cl. ........................ 323/222; 323/271; 323/282; 323/908
(58) Field of Classification Search ................. 323/222, 323/223, 224, 225, 271, 282, 284, 351, 908; 327/530, 534
See application file for complete search history.

(56) References Cited

U.S. PATENT DOCUMENTS 5,929,615 A * 7/1999 D'Angelo et al. ........... 323/224
7,084,611 B2 * 8/2006 Kirchner et al. ............. 323/222

FOREIGN PATENT DOCUMENTS

| JP | 8-251913 A | 9/1996 |
| JP | 2005-253254 A | 9/2005 |
| JP | 2005-295629 | 10/2005 |

* cited by examiner

*Primary Examiner*—Gary L Laxton
(74) *Attorney, Agent, or Firm*—Miles & Stockbridge P.C.

(57) ABSTRACT

There is a need for preventing a MOS transistor from being destroyed due to an inrush current from an input terminal when a boost operation starts from a boost disabling state. During the boost operation, a third MOS transistor (M3) turns off and a fourth MOS transistor (M4) turns on to prevent a current leak from an output terminal (Vout) to an input terminal (Vin) due to a parasitic diode of a second MOS transistor (M2). In the boost disabling state, the third MOS transistor turns on and the fourth MOS transistor turns off to prevent a current leak from the input terminal to the output terminal due to the parasitic diode of the second MOS transistor. When the boost operation starts from the boost disabling state, an electrode toward the output terminal of the second MOS transistor is charged before changing a substrate bias state of this transistor. In this manner, an inrush current is prevented from flowing from the input terminal to the output terminal via the parasitic diode of the second MOS transistor.

18 Claims, 6 Drawing Sheets

VOLTAGE CONVERTER AND SEMICONDUCTOR INTEGRATED CIRCUIT

BACKGROUND OF THE INVENTION

The present invention relates to a boost converter as a boost switching regulator or a boost chopper circuit. More specifically, the invention relates to a technology effectively applicable to a semiconductor integrated circuit having a DC-DC boost converter.

A boost converter as a boost chopper circuit supplies an electric current from an inductor to a first MOS transistor to accumulate an energy in the inductor. The boost converter supplies an electric current to a second MOS transistor from the inductor where the energy is accumulated. By repeating this operation, the boost converter is supplied with a boost voltage at an output terminal coupled to a smoothing capacitor. According to its characteristic, the boost converter causes an input terminal voltage lower than an output terminal voltage during a boost operation that complementarily controls the first and second MOS transistors. The input terminal is coupled to the inductor and is supplied with an electric current. By contrast, a higher voltage is applied to the input terminal in a boost disabling state that turns off the first and second MOS transistors. That is, the boost operation and the boost disabling state reverse a source/drain structure of the second MOS transistor. Japanese patent laid-open Nos. 1996-251913, 2005-253254, and 2005-295629 describe the technologies of using a switch to couple a back gate (substrate) of the second MOS transistor to the input or output terminal depending on the boost operation or the boost disabling state. During the boost operation, the technologies prevent an electric current from leaking from the output terminal to the input terminal due to a parasitic diode of the second MOS transistor. During the boost disabling state, the technologies prevent an electric current from leaking from the input terminal to the output terminal due to a parasitic diode of the second MOS transistor.

SUMMARY OF THE INVENTION

However, starting the boost operation from the boost disabling state may also change the substrate bias state of the second MOS transistor. At this moment, an inrush current flows from the input terminal to the output terminal via the parasitic transistor formed in the second MOS transistor. The second MOS transistor may then be destroyed.

It is an object of the invention to provide a boost converter capable of preventing a MOS transistor from being destroyed due to an inrush current from an input terminal when a boost operation starts from a boost disabling state. It is another object of the invention to provide a semiconductor integrated circuit having such a boost converter.

These and other objects and novel features of the invention may be readily ascertained by referring to the following description and appended drawings.

The following briefly summarizes representative aspects of the present invention disclosed in the application concerned.

[1] A boost converter (BST) according to an aspect of the invention complementarily switches a first MOS transistor (M1) and a second MOS transistor (M2) flowing, in different directions, an electric current supplied from an input terminal coupled to an inductor and can thereby perform a boost operation of generating a boost voltage at an output terminal coupled to the second MOS transistor. The boost converter includes a third MOS transistor (M3) coupled between a substrate of the second MOS transistor and an electrode toward the input terminal of the second MOS transistor; a fourth MOS transistor (M4) coupled between the substrate of the second MOS transistor and an electrode toward the output terminal of the second MOS transistor; and a control circuit (BGCNT or BSTCNT). The control circuit turns off the third MOS transistor and turns on the fourth MOS transistor during the boost operation, turns on the third MOS transistor and turns off the fourth MOS transistor in a boost disabling state of turning off the first and second MOS transistors, and charges the electrode toward the output terminal of the second MOS transistor before starting the boost operation from the boost disabling state. The second, third, and fourth MOS transistors are of p-channel type.

As mentioned above, the boost converter turns off the third MOS transistor and turns on the fourth MOS transistor during the boost operation. In this manner, the boost converter prevents a current leak from the output terminal to the input terminal due to a parasitic diode of the second MOS transistor. The boost converter turns on the third MOS transistor and turns off the fourth MOS transistor in the boost disabling state. In this manner, the boost converter prevents a current leak from the input terminal to the output terminal due to the parasitic diode of the second MOS transistor. When the boost operation starts from the boost disabling state, the boost converter charges an electrode toward the output terminal of the second MOS transistor before changing a substrate bias state of the second MOS transistor. No inrush current flows from the input terminal to the output terminal via the parasitic diode formed in the second MOS transistor. It is possible to prevent the second MOS transistor from being destroyed due to such an inrush current.

The substrate bias polarity reverses when n-channel transistors are used for the second, third, and fourth MOS transistors. That is, the boost converter turns on the third MOS transistor and turns off the fourth MOS transistor during the boost operation. In this manner, the boost converter prevents a current leak from the output terminal to the input terminal due to the parasitic diode of the second MOS transistor. The boost converter turns off the third MOS transistor and turns on the fourth MOS transistor in the boost disabling state. In this manner, the boost converter prevents a current leak from the input terminal to the output terminal due to the parasitic diode of the second MOS transistor. When the boost operation starts from the boost disabling state, similarly to the above, the boost converter charges the electrode toward the output terminal of the second MOS transistor before changing the substrate bias state of the second MOS transistor. No inrush current flows from the input terminal to the output terminal via the parasitic diode formed in the second MOS transistor. It is possible to prevent the second MOS transistor from being destroyed due to such inrush current.

As a specific mode of the invention, a substrate is coupled to the second, third, and fourth MOS transistors in common with each other. This makes it possible to completely suppress a leak between the input and output terminals via the third and fourth MOS transistors.

As another specific mode of the invention, the control circuit performs the charging operation at a voltage level equivalent to that for the input terminal. The boost converter may include a semiconductor integrated circuit having input and output terminals as external terminals.

[2] A semiconductor integrated circuit according to another aspect of the invention has a plurality of the boost converters (BST_1 through BST_7) as first boost converters and having another second boost converter (BST_0). The first boost converters use an output voltage from the second boost converter as an operating power supply. The second boost converter uses its own output voltage as an operating power supply. The second boost converter complementarily switches first and second MOS transistors flowing, in different directions, an electric current supplied from an input terminal coupled to an inductor and can thereby perform a boost operation of generating a boost voltage at an output terminal coupled to the second MOS transistor. The second MOS transistor allows a source to be coupled to a substrate during a boost operation. The first MOS transistor turns off and the second MOS transistor turns on in a boost disabling state. It is possible to ensure a power supply for charging and substrate bias switch control operations when the first boost converters start the boost operation from the boost disabling state. The input and output terminals are equivalent to external terminals of the semiconductor integrated circuit, for example.

[3] A semiconductor integrated circuit according to still another aspect of the invention has a boost converter. The boost converter includes: an input terminal powered via an inductor; an output terminal for power output; a first MOS transistor with one end coupled to the input terminal and another end coupled to a circuit ground; a p-channel second MOS transistor with one end coupled to the input terminal and another end coupled to the output terminal; and a boost control circuit for controlling a boost operation and a boost disabling state. The boost operation complementarily controls switching between the first and second MOS transistors based on a voltage of the output terminal to generate a specified voltage at the output terminal. The boost disabling state turns off the first and second MOS transistors. The boost converter further includes: a p-channel third MOS transistor coupled between a substrate of the second MOS transistor and an electrode toward the input terminal of the second MOS transistor; a p-channel fourth MOS transistor coupled between a substrate of the second MOS transistor and an electrode toward the output terminal of the second MOS transistor; and a substrate bias switch control circuit. The substrate bias switch control circuit turns off the third MOS transistor and turns on the fourth MOS transistor in the boost operation. The substrate bias switch control circuit turns on the third MOS transistor and turns off the fourth MOS transistor in the boost disabling state. The substrate bias switch control circuit charges an electrode toward the output terminal of the second MOS transistor and switches between the third and fourth MOS transistors to start the boost operation from the boost disabling state.

When the boost operation starts from the boost disabling state, this semiconductor integrated circuit also charges the electrode toward the output terminal of the second MOS transistor before changing the substrate bias state of the second MOS transistor. No inrush current flows from the input terminal to the output terminal via the parasitic diode formed in the second MOS transistor. It is possible to prevent the second MOS transistor from being destroyed due to such inrush current.

Similarly to the above, transistors of the n-channel conductivity type can be used for the second, third, and fourth MOS transistors to construct the boost converter. In this case, the substrate bias switch control circuit turns on the third MOS transistor and turns off the fourth MOS transistor in the boost operation. The substrate bias switch control circuit turns off the third MOS transistor and turns on the fourth MOS transistor in the boost disabling state. The substrate bias switch control circuit charges an electrode toward the output terminal of the second MOS transistor and switches between the third and fourth MOS transistors to start the boost operation from the boost disabling state.

As still another specific mode of the invention, a substrate is coupled to the second, third, and fourth MOS transistors in common.

As yet another specific mode of the invention, the substrate bias switch control circuit includes: a charging circuit that charges an output terminal in response to an external instruction for starting the boost operation from the boost disabling state; and a detection circuit that detects a match between a voltage at the output terminal and a voltage at the input terminal, stops a charging operation, and instructs to switch between the third and fourth MOS transistors and start a boost operation.

The following describes an effect resulting from the representative aspects of the present invention disclosed in the application concerned.

That is, it is possible to prevent a MOS transistor from being destroyed due to an inrush current when the boost converter starts the boost operation from the boost disabling state.

DETAILED DESCRIPTION OF THE PREFERRED EMBODIMENTS

Figure 1:
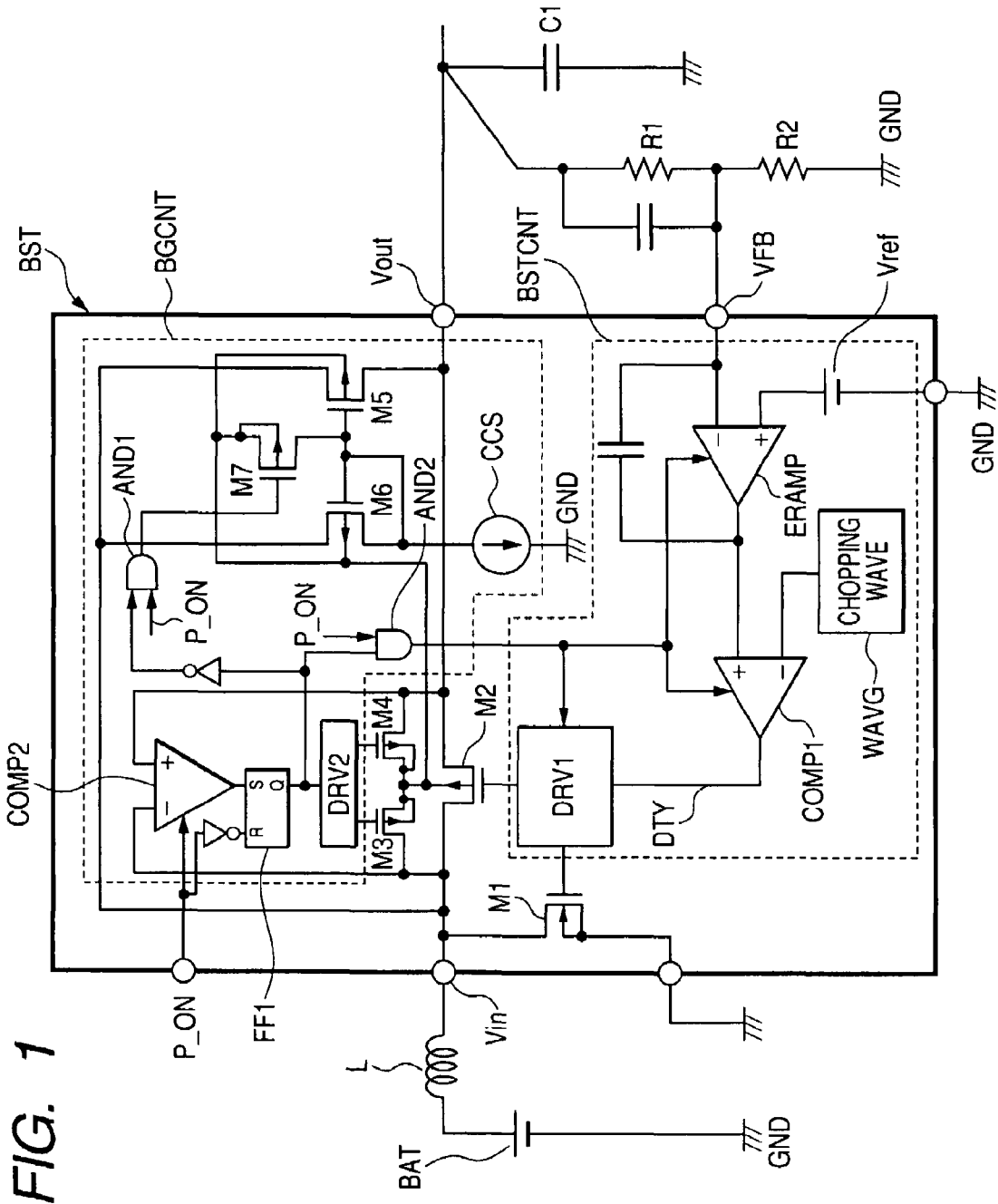
FIG. 1 is a circuit diagram showing a boost converter according to the invention.

FIG. 1 exemplifies a boost converter BST according to the invention. The boost converter BST is supplied with a power at an input terminal Vin via an inductor L and generates a boost voltage at an output terminal Vout. The input terminal Vin is supplied with power from a battery power supply BAT. A basic configuration for boosting is equivalent to the switch regulator configuration. There are provided a p-channel first MOS transistor M1 and a p-channel second MOS transistor M2. One end of the first MOS transistor M1 is coupled to the input terminal Vin and the other end is coupled to a ground GND of the circuit. One end of the second MOS transistor M2 is coupled to the input terminal Vin and the other end is coupled to the output terminal Vout. A boost control circuit BSTCNT controls switching between the first MOS transistor M1 and the second MOS transistor M2.

During a boost operation, the boost control circuit BSTCNT complementarily controls switching between the first MOS transistor M1 and the second MOS transistor M2. When the first MOS transistor M1 turns on, an electric current is supplied to the inductor L toward the ground terminal GND. The inductor L accumulates an energy. When the second MOS transistor M2 turns on, the energy accumulated in the inductor L causes an electric current to be supplied to the output terminal Vout from the inductor L. A smoothing capacitor C1 coupled to the output terminal Vout is charged. A voltage dividing circuit including resistors R1 and R2 divides the voltage at the output terminal Vout. The divided voltage is supplied to a detection terminal VFB. The boost control circuit 3 receives a feedback voltage from the detection terminal VFB at an inverting input terminal (−) of an error amplifier ERAMP and inversely amplifies a reference voltage Vref for its noninverting input terminal (+). An output from the error amplifier ERAMP is coupled to a noninverting input terminal of a comparator COMP1. An oscillation circuit WAVG supplies a chopping wave signal to its noninverting input terminal (+). The comparator COMP1 outputs a high level when the chopping wave voltage exceeds an output voltage from the error amplifier ERAMP. The comparator COMP1 outputs a low level when the chopping wave voltage is lower than an output voltage from the error amplifier ERAMP. Accordingly, increasing a voltage from the output terminal Vout decreases an on-duty ratio for a signal DTY output from the comparator COMP1. The output signal DTY from the comparator COMP1 is supplied to a driver DRV1. While the signal DTY is high, the driver DRV1 turns on the MOS transistor M1 and turns off the MOS transistor M2. While the signal DTY is low, the driver DRV1 turns off the MOS transistor M1 and turns on the MOS transistor M2. In this manner, the boost control circuit BSTCNT controls on-duty ratios of the MOS transistors M1 and M2 to control a boost operation for generating a given boost voltage in the output terminal Vout. The boost control circuit BSTCNT turns off the MOS transistors M1 and M2 to disable the boost state.

The boost operation causes a higher voltage at the output terminal Vout than at the input terminal Vin. Conversely, the boost disabling state causes a lower voltage at the output terminal Vout than at the input terminal Vin. The source and the drain of the MOS transistor M2 interchange with each other in the boost operation and the boost disabling state. There are provided a p-channel third MOS transistor M3 and a p-channel fourth MOS transistor M4 for enabling interchangeable coupling between the substrate and the source of the MOS transistor. The third MOS transistor M3 is coupled between the substrate (back gate) of the MOS transistor M2 and an electrode toward the input terminal Vin of the MOS transistor M2. The fourth MOS transistor M4 is coupled between the back gate of the second MOS transistor M2 and an electrode toward the input terminal Vout of the MOS transistor M2. A substrate bias switch control circuit BGCNT controls the third MOS transistor M3 and the fourth MOS transistor M4. During the boost operation, the substrate bias switch control circuit BGCNT turns off the third MOS transistor M3 and turns on the fourth MOS transistor M4. During the boost disabling state, the substrate bias switch control circuit BGCNT turns on the third MOS transistor M3 and turns off the fourth MOS transistor M4. The boost operation starts from the boost disabling state as follows. The substrate bias switch control circuit BGCNT charges the electrode toward the output terminal of the second MOS transistor. The substrate bias switch control circuit BGCNT changes the switch states of the third and fourth MOS transistors to start the boost operation. During the boost operation, the substrate bias switch control circuit BGCNT turns off the MOS transistor M3 and turns on the MOS transistor M4. This can prevent an electric current leak from the output terminal Vout to the input terminal Vin due to the parasitic diode of the MOS transistor M2. In the boost disabling state, the substrate bias switch control circuit BGCNT turns on the MOS transistor M3 and turns off the MOS transistor M4. This can prevent an electric current leak from the input terminal to the output terminal due to the parasitic diode of the MOS transistor M2. When the boost operation starts from the boost disabling state, the substrate bias switch control circuit BGCNT charges the electrode toward the output terminal Vout of the MOS transistor M2 before changing the substrate bias state of the MOS transistor M2. When the substrate bias state is changed, no inrush current flows from the input terminal Vin to the output terminal Vout via the parasitic diode formed in the MOS transistor M2. It is possible to prevent the possibility of destroying the MOS transistor M2 due to the inrush current.

The following describes a specific logical construction of the substrate bias switch control circuit BGCNT. P_ON is an externally supplied boost enable signal. The signal P_ON, when high, specifies the boost operation and, when low, specifies the boost disabling state. DRV2 is a driver for complementarily switching the MOS transistors M3 and M4. When a flip-flop FF1 is set to generate a high-level output Q, the driver DRV2 accordingly turns off the MOS transistor M3 and turns on the MOS transistor M4 to enable the boost operation. When the flip-flop FF1 is reset to generate a low-level output Q, the driver DRV2 accordingly turns on the MOS transistor M3 and turns off the MOS transistor M4 to enable the boost disabling state. P-channel MOS transistors M5, M6, and M7, and a constant current source CCS constitute a charging circuit. The MOS transistor M5 configures a current mirror circuit with the MOS transistor M6. Via the MOS transistor M6, the MOS transistor M5 flows an electric current from the input terminal Vin to the output terminal Vout. This electric current corresponds to an electric current flowing from the input terminal Vin to the constant current source CCS. In this manner, the MOS transistor M5 charges the electrode toward the output terminal Vout of the MOS transistor M2. Common gates of the MOS transistors M5 and M6 are coupled to back gates of the MOS transistors M5 and M6 via a MOS transistor M7. The back gates of the MOS transistors M5, M6, and M7 are coupled to a back gate of the MOS transistor M2. When the MOS transistor M7 turns on, the MOS transistors M5 and M6 are supplied with an equal potential for their gates and back gates and consequently turn off. The MOS transistors M5 and M6 perform a current mirror operation when the MOS transistor M7 is off. The high-level boost enable signal P_ON activates the comparator COMP2. The activated comparator COMP2 compares a voltage charged by the MOS transistor M5 with the input terminal Vin. A comparison output from the comparator COMP2 is coupled to a set terminal S of the flip-flop FF1. A reset terminal R of the flip-flop FF1 is supplied with an inverted signal of the boost enable signal P_ON. An AND gate AND1 is supplied with an inverted signal at the output terminal Q of the flip-flop FF1 and the boost enable signal P_ON. An AND signal from the AND gate AND1 provides switching control over the gate of the MOS transistor M7. An AND gate AND2 is supplied with an output signal Q from the flip-flop FF1 and the boost enable signal P_ON. The AND gate AND2 uses a high-level AND signal to activate the driver DRV1, the comparator COMP1, and the error amplifier ERAMP. The AND gate AND2 uses a low-level AND signal to deactivates them.

Figure 2:
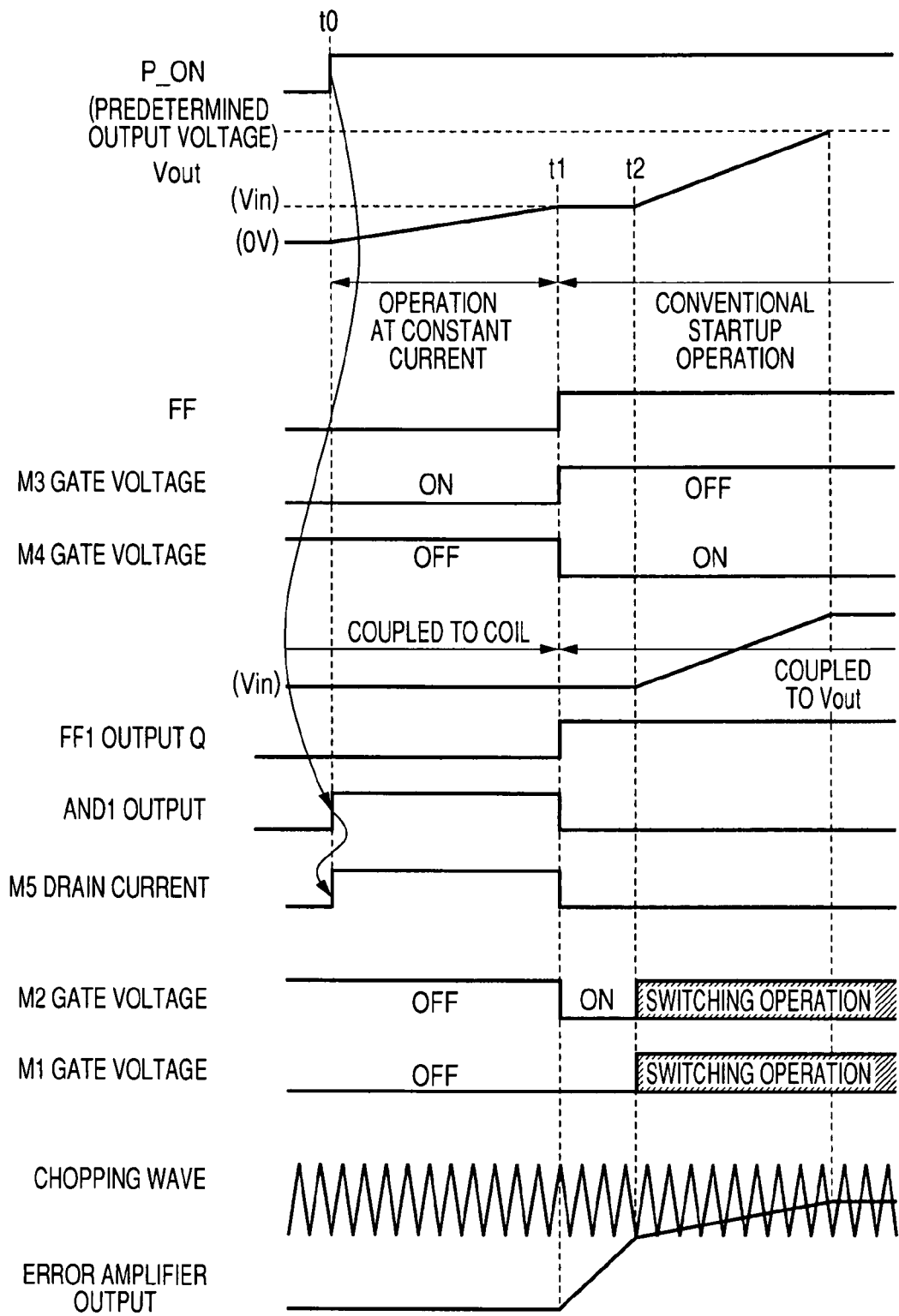
FIG. 2 is a timing chart showing a control operation based on a boost control circuit and a substrate bias switch control circuit.

The following describes control operations of the boost control circuit BSTCNT and the substrate bias switch control circuit BGCNT with reference to FIG. 2. When the boost enable signal P_ON is low for disabling the boost, the boost control circuit BSTCNT turns off the MOS transistors M1 and M2 to disable the boost. In the substrate bias switch control circuit BGCNT, the flip-flop FF1 is reset. The MOS transistor M3 turns on. The MOS transistor M4 turns off. The back gate of the MOS transistor M2 is supplied with its source potential (voltage of the input terminal Vin). In this manner, the substrate bias switch control circuit BGCNT suppresses a substrate leak from the input terminal Vin to the back gate. At this time, the MOS transistor M7 turns on. The MOS transistors M5 and M6 constituting the current mirror circuit go into cut-off state. The output terminal Vout is not charged. When boost enable signal P_ON becomes high to enable the boost (time t0), an output from the AND gate AND1 inverts to be high. This turns off the MOS transistor M5. As a result, the input terminal Vin supplies an electric current to the node toward the output terminal Vout of the MOS transistor M2 via the MOS transistor M5 contained in the current mirror circuit. When the charged voltage matches the level of the input terminal Vin (time t1), the comparator COMP2 for detecting this state sets the flip-flop FF1. Consequently, the MOS transistor M7 turns on to stop the charging operation. The MOS transistor M3 turns off and the MOS transistor M4 turns on to couple the back gate of the MOS transistor M2 to the output terminal Vout. The boost control circuit BSTCNT then starts a control operation. When the back gate of the MOS transistor M2 is coupled to the output terminal Vout, the node toward the output terminal Vout is already charged to an input voltage level of the input terminal Vin. Accordingly, no inrush current is supplied to MOS transistor M2. The boost control circuit BSTCNT starts the control operation to increase an output from the error amplifier ERAMP (time t2). The MOS transistors M1 and M2 start a complementary switching operation based on an output from the comparator COMP1. This starts boosting the voltage of the output terminal Vout. Though not shown in FIG. 2, when the boost enable signal P_ON becomes low (for disabling the boost), the boost control circuit BSTCNT stops the boost operation. The flip-flop FF1 is reset. The MOS transistor M3 turns on and the MOS transistor M4 turns off to change the destination of coupling the back gate of the MOS transistor M2. The MOS transistor M7 remains on.

Figure 3:
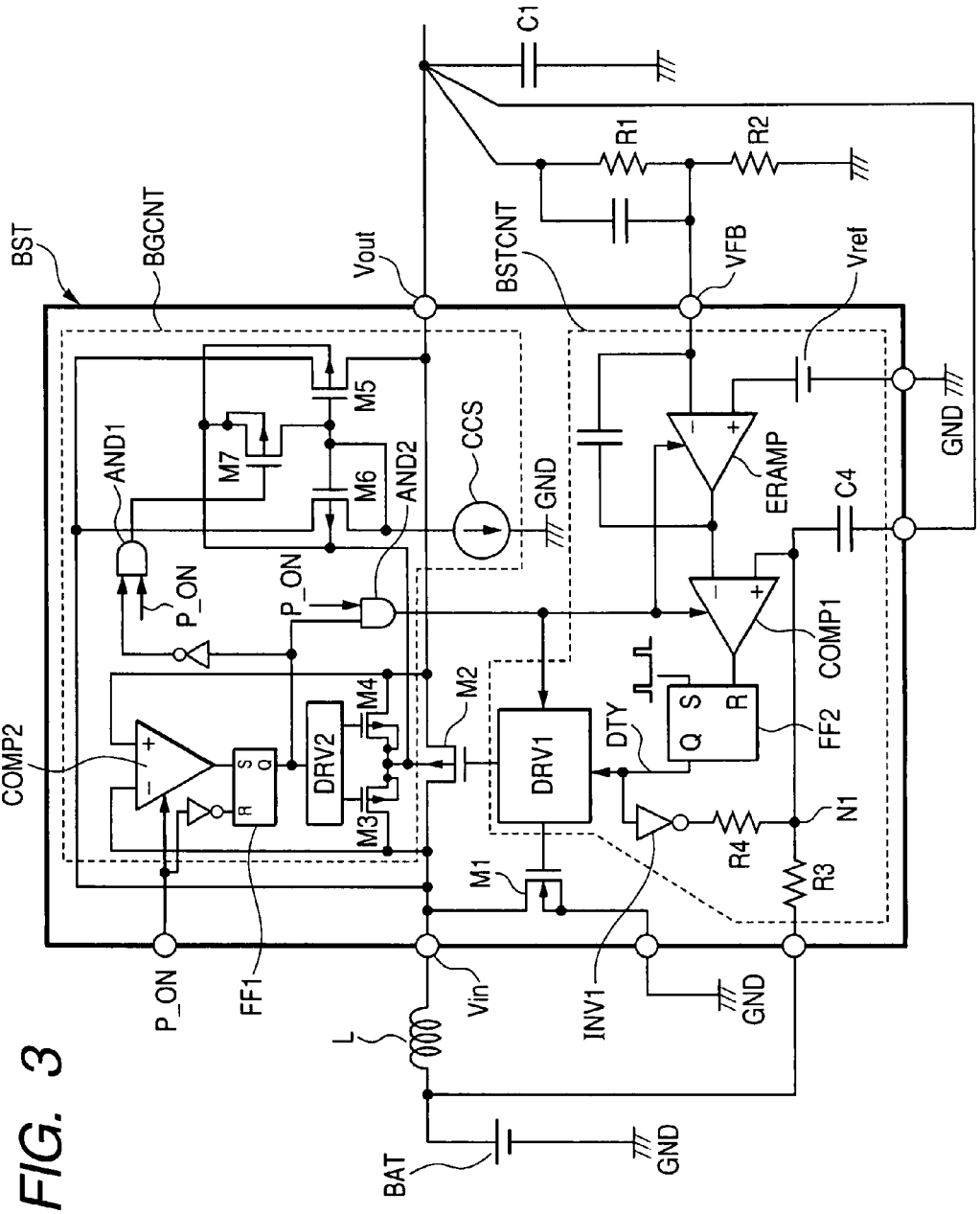
FIG. 3 is a circuit diagram showing a boost converter having a boost control circuit different from that used in FIG. 1.

FIG. 3 shows another example of the boost converter. FIG. 3 differs from FIG. 1 in the construction of the boost control circuit BSTCNT. An output from the comparator COMP1 is received at a reset terminal R of a flip-flop FF2. A clock pulse signal is supplied to a set terminal S of the flip-flop FF2. An output from an output terminal Q of the flip-flop FF2 drives the driver DRV1. When the output terminal Q of the flip-flop FF2 goes high, the MOS transistor M1 turns on and the MOS transistor M2 turns off. When the output terminal Q of the flip-flop FF2 goes low, the MOS transistor M1 turns off and the MOS transistor M2 turns on. The output terminal Q of the flip-flop FF2 is coupled to one end of the inductor L via a serial circuit of an inverter INV1 and resistors R4 and R3. A couple node N1 for the resistors R4 and R3 is coupled to the output terminal Vout via a capacitor C4. According to the boost control circuit BSTCNT, the inverter INV1 incorporates an electric current via the resistors R3 and R4 while the MOS transistor M1 turns on. As the electric current increases in the inductor L, a potential increases at the couple node N1 for the resistors R3 and R4 to charge the capacitor C4. While the MOS transistor M1 is off, an electric current flows from the inductor L to the output terminal. At this time, the capacitor C4 is discharged via the resistor R3 to decrease the potential of the node N1. In this manner, the voltage of the node N1 corresponds to the waveform of the electric current flowing through the inductor during the boost operation. The MOS transistor M1 turns on and the MOS transistor M2 turns off in synchronization with a rise of a clock pulse supplied to the set terminal S of the flip-flop FF2. The MOS transistor M1 turns off and the MOS transistor M2 turns on when the voltage of the node N1 exceeds an output voltage of the error amplifier ERAMP. The on-duty ratios of the MOS transistors M1 and M2 are controlled in accordance with the voltage of the output terminal Vout. The substrate bias switch control circuit BGCNT is the same as that in FIG. 1 and a detailed description is omitted for simplicity.

Figure 4:
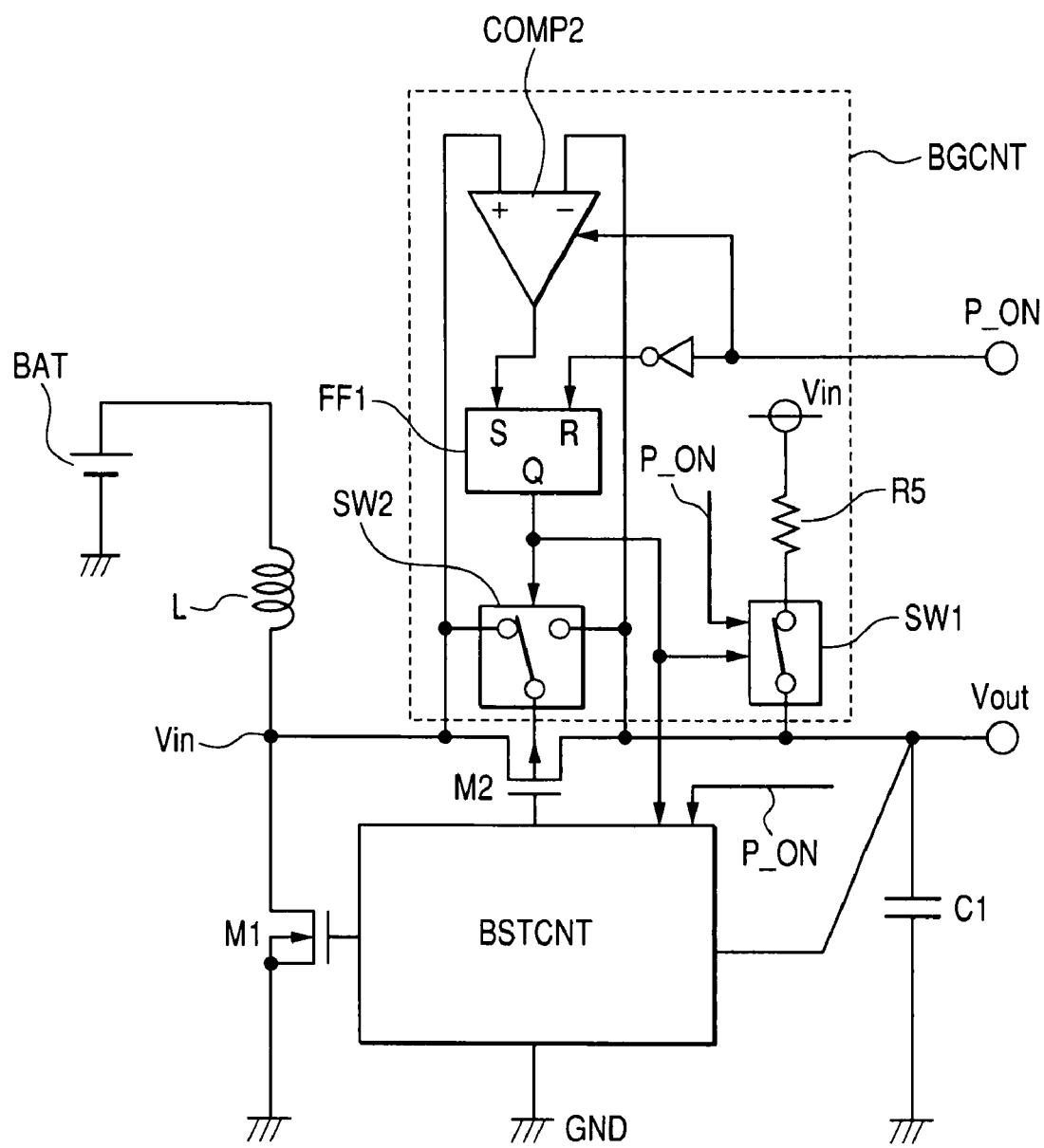
FIG. 4 is a circuit diagram showing a boost converter having a substrate bias switch control circuit different from that used in FIG. 1.

FIG. 4 shows still another example of the boost converter. FIG. 4 differs from FIG. 1 in the construction of the charging circuit of the substrate bias switch control circuit BGCNT. A node toward the output terminal Vout of the MOS transistor M2 is coupled to the input terminal Vin via a switch circuit SW1 and a pull-up resistor R5. The switch SW1 includes a p-channel MOS transistor that is controlled for switching based on a NAND signal between the boost enable signal P_ON and an inverted signal at the output terminal Q of the flip-flop FF1. A switch SW2 includes the MOS transistors M3 and M4 and the driver DRV2 as described in FIG. 1. The other parts of the construction are the same as those in FIG. 1 and a detailed description is omitted for simplicity.

Figure 5:
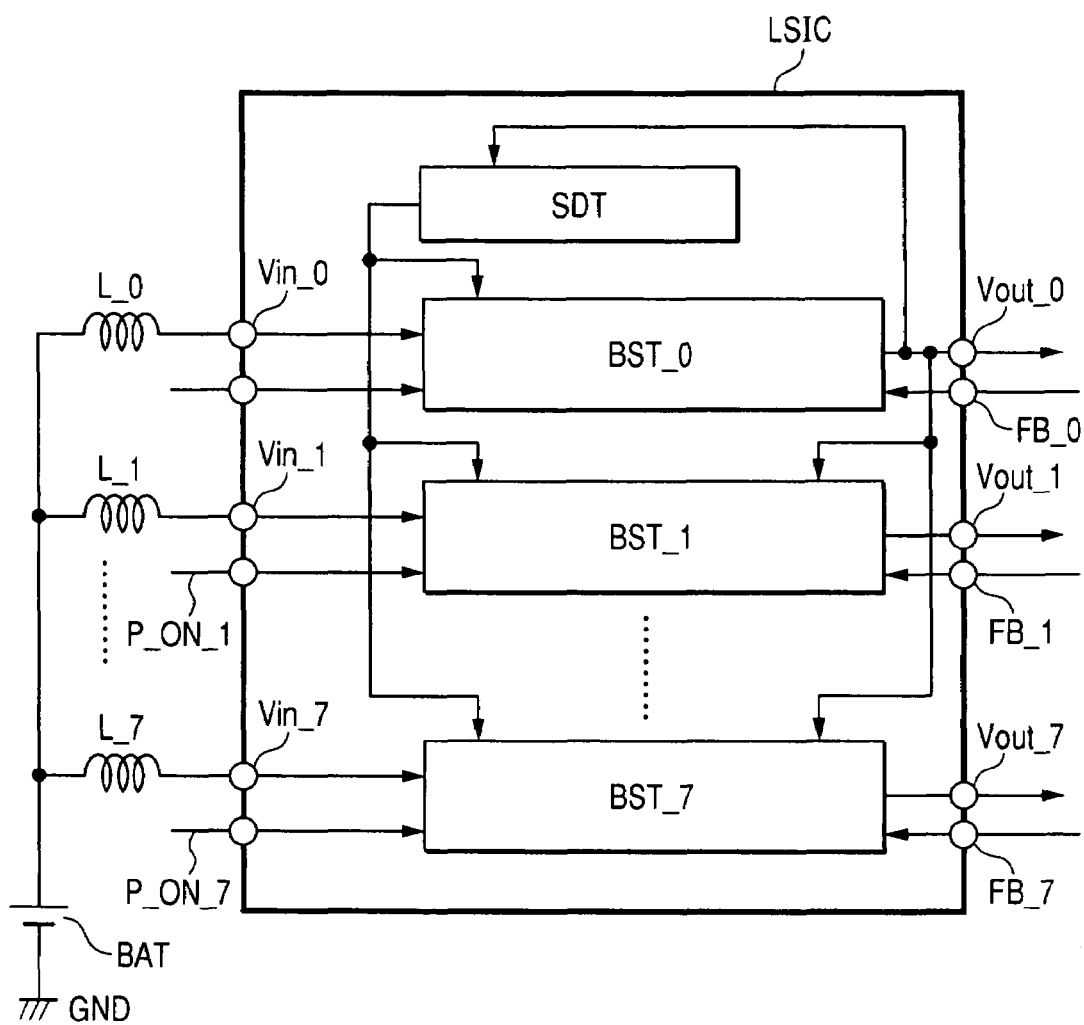
FIG. 5 is a block diagram showing a semiconductor integrated circuit using the boost converter as shown in FIGS. 1 and 3.
Figure 6:
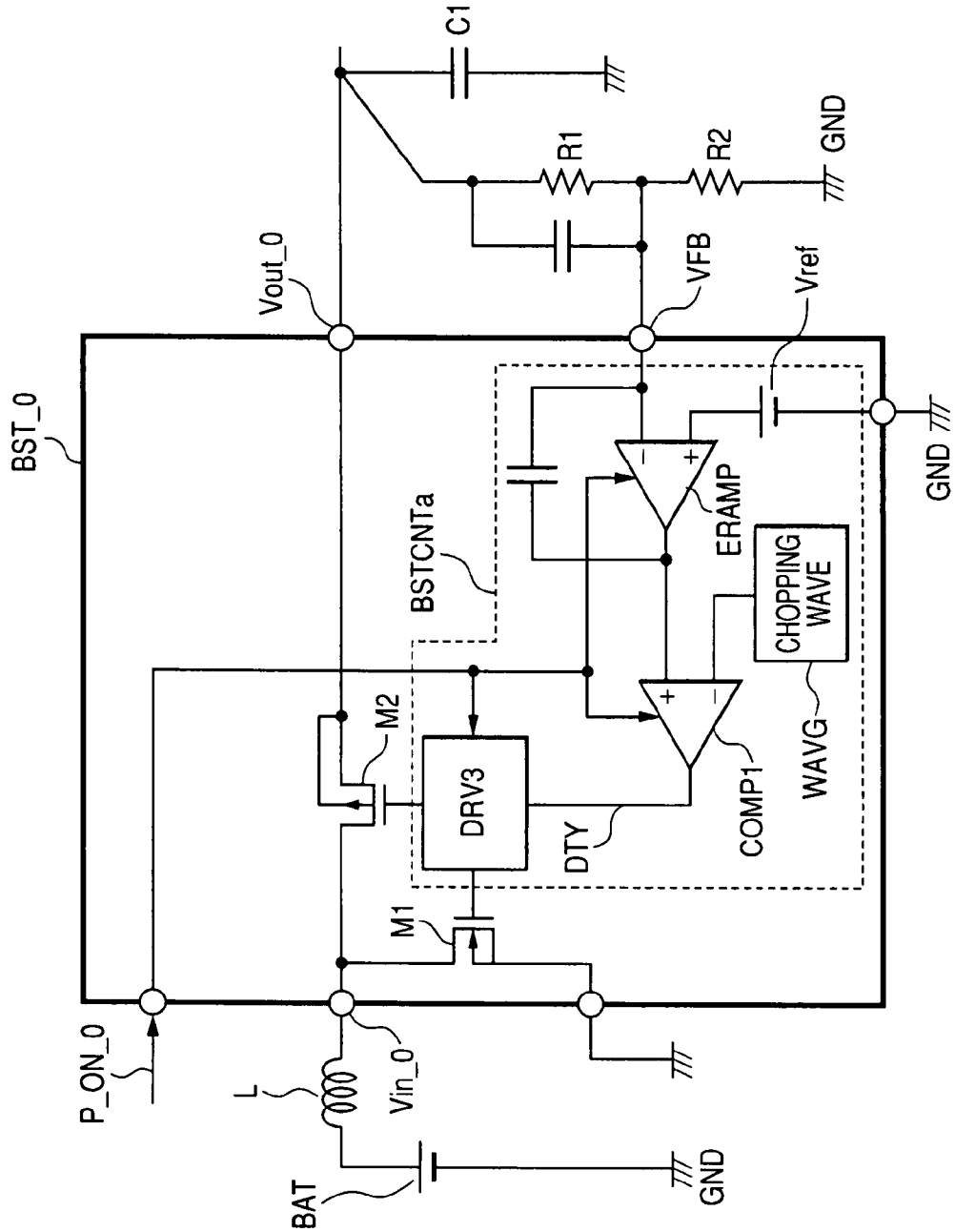
FIG. 6 is a circuit diagram showing another boost converter to ensure an operating power supply for restarting the boost converter of FIG. 1 or the like in the semiconductor integrated circuit of FIG. 5 when a boost disabling state takes effect.

FIG. 5 shows a semiconductor integrated circuit LSIC using the boost converter BST as shown in FIGS. 1 and 3. The boost converter BST shown in FIGS. 1 and 3 can include a single semiconductor integrated circuit. In this example, one semiconductor substrate such as monocrystalline silicon contains eight boost converters BST_0 through BST_7 and a step-down regulator SDT. The boost converters BST_1 through BST_7 have the same circuit construction as described so far. The substrate bias switch control circuit BGCNT for the step-down regulator SDT and the boost converters BST_1 through BST_7 uses an output voltage from a boost converter BST_0 as an operating power supply. The boost control circuit BSTCNT for the boost converters BST_1 through BST_7 uses an output voltage from the step-down regulator SDT as an operating power supply. The boost converter BST_0 has a circuit construction as shown in FIG. 6. Differently from FIG. 1, the substrate bias switch control circuit BGCNT is not used. As another difference from FIG. 1, a driver DRV3 of a boost control circuit BSTCNTa turns off M1 and turns on M2 when an enable signal P_ON_0 goes low to disable the boost. In the boost disabling state, the boost converter BST_0 directly outputs a power from the input terminal Vin to the output terminal Vout. The boost converter BST_0 uses an output voltage from the output terminal Vout for its own power supply. The enable signals P_ON_0 through P_ON_7 can control to enable and disable the boost for the boost converters BST_0 through BST_7 individually.

The semiconductor integrated circuit in FIG. 5 can reduce power consumption in the boost control circuit BSTCNT for the boost converters BST_1 through BST_7 that frequently perform the switching control. In addition, it is possible to ensure a power supply for charging and substrate bias switch control operations when the substrate bias switch control circuit in each of the boost converters BST_1 through BST_7 starts the boost operation from the boost disabling state.

While there have been described specific preferred embodiments of the present invention made by the inventors, it is to be distinctly understood that the present invention is not limited thereto but may be otherwise variously embodied within the spirit and scope of the invention.

While FIG. 5 shows the number of boost converters BST_1 through BST_7 and their arrangement in the semiconductor integrated circuit, the invention is not limited thereto. Theoretically, the MOS transistor M2 can conform to the n-channel type instead of the p-channel type. In this case, it is preferable to use n-channel MOS transistors M3 and M4. The MOS transistors M3 and M4 may be provided with a switching control reverse to the case of the above-mentioned p-channel type in the boost operation and the boost disabling state. The MOS transistors M5 through M7 can be also constructed as the n-channel type.

What is claimed is:

1. A boost converter that complementarily switches first and second MOS transistors flowing, in different directions, an electric current supplied from an input terminal coupled to an inductor and can thereby perform a boost operation of generating a boost voltage at an output terminal coupled to the second MOS transistor, the boost converter comprising:
   a third MOS transistor coupled between a substrate of the second MOS transistor and an electrode toward the input terminal of the second MOS transistor;
   a fourth MOS transistor coupled between the substrate of the second MOS transistor and an electrode toward the output terminal of the second MOS transistor; and
   a control circuit that turns off the third MOS transistor and turns on the fourth MOS transistor during the boost operation, turns on the third MOS transistor and turns off the fourth MOS transistor in a boost disabling state of turning off the first and second MOS transistors, and charges the electrode toward the output terminal of the second MOS transistor before starting the boost operation from the boost disabling state,
   wherein the second, third, and fourth MOS transistors are of p-channel type.

2. The semiconductor integrated circuit according to claim 1,
   wherein a substrate is coupled to the second, third, and fourth MOS transistors in common.

3. The boost converter according to claim 2,
   wherein a level of the charging performed by the control circuit is equivalent to a voltage level of the input terminal.

4. The boost converter according to claim 1, comprising a semiconductor integrated circuit having the input terminal and the output terminal as external terminals.

5. A semiconductor integrated circuit having a plurality of the boost converters according to claim 1, as first boost converters and having another second boost converter,
   wherein the first boost converters use an output voltage from the second boost converter as an operating power supply;
   wherein the second boost converter uses its own output voltage as an operating power supply;
   wherein the second boost converter complementarily switches first and second MOS transistors flowing, in different directions, an electric current supplied from an input terminal coupled to an inductor and can thereby perform a boost operation of generating a boost voltage at an output terminal coupled to the second MOS transistor;
   wherein the second MOS transistor allows a source to be coupled to a substrate during a boost operation; and
   wherein the first MOS transistor turns off and the second MOS transistor turns on in a boost disabling state.

6. The semiconductor integrated circuit according to claim 5 having the input terminal and the output terminal as external terminals.

7. A boost converter that complementarily switches first and second MOS transistors flowing, in different directions, an electric current supplied from an input terminal coupled to an inductor and can thereby perform a boost operation of generating a boost voltage at an output terminal coupled to the second MOS transistor, the boost converter comprising:
   a third MOS transistor coupled between a substrate of the second MOS transistor and an electrode toward the input terminal of the second MOS transistor;
   a fourth MOS transistor coupled between the substrate of the second MOS transistor and an electrode toward the output terminal of the second MOS transistor; and
   a control circuit that turns on the third MOS transistor and turns off the fourth MOS transistor during the boost operation, turns off the third MOS transistor and turns on the fourth MOS transistor in a boost disabling state of turning off the first and second MOS transistors, and charges the electrode toward the output terminal of the second MOS transistor before starting the boost operation from the boost disabling state,
   wherein the second, third, and fourth MOS transistors are of n-channel type.

8. The semiconductor integrated circuit according to claim 7,
   wherein a substrate is coupled to the second, third, and fourth MOS transistors in common.

9. The boost converter according to claim 8,
   wherein a level of the charging performed by the control circuit is equivalent to a voltage level of the input terminal.

10. The boost converter according to claim 7, comprising a semiconductor integrated circuit having the input terminal and the output terminal as external terminals.

11. A semiconductor integrated circuit having a plurality of the boost converters according to claim 7, as first boost converters and having another second boost converter,
    wherein the first boost converters use an output voltage from the second boost converter as an operating power supply;
    wherein the second boost converter uses its own output voltage as an operating power supply;
    wherein the second boost converter complementarily switches first and second MOS transistors flowing, in different directions, an electric current supplied from an input terminal coupled to an inductor and can thereby perform a boost operation of generating a boost voltage at an output terminal coupled to the second MOS transistor;
    wherein the second MOS transistor allows a source to be coupled to a substrate during a boost operation; and
    wherein the first MOS transistor turns off and the second MOS transistor turns on in a boost disabling state.

12. The semiconductor integrated circuit according to claim 11 having the input terminal and the output terminal as external terminals.

13. A semiconductor integrated circuit comprising a boost converter having:
    an input terminal powered via an inductor;
    an output terminal for power output;
    a first MOS transistor with one end coupled to the input terminal and another end coupled to a circuit ground;
    a p-channel second MOS transistor with one end coupled to the input terminal and another end coupled to the output terminal;
    a boost control circuit for controlling a boost operation and a boost disabling state, wherein the boost operation complementarily controls switching between the first and second MOS transistors based on a voltage of the output terminal to generate a specified voltage at the output terminal; and wherein the boost disabling state turns off the first and second MOS transistors;

a p-channel third MOS transistor coupled between a substrate of the second MOS transistor and an electrode toward the input terminal of the second MOS transistor;

a p-channel fourth MOS transistor coupled between a substrate of the second MOS transistor and an electrode toward the output terminal of the second MOS transistor;

a substrate bias switch control circuit that turns off the third MOS transistor and turns on the fourth MOS transistor in the boost operation, turns on the third MOS transistor and turns off the fourth MOS transistor in the boost disabling state, and charges an electrode toward the output terminal of the second MOS transistor and switches between the third and fourth MOS transistors to start the boost operation from the boost disabling state.

14. The semiconductor integrated circuit according to claim 13,
wherein a substrate is coupled to the second, third, and fourth MOS transistors in common.

15. The semiconductor integrated circuit according to claim 14,
wherein the substrate bias switch control circuit includes:
a charging circuit that charges an output terminal in response to an external instruction for starting the boost operation from the boost disabling state; and
a detection circuit that detects a match between a voltage at the output terminal and a voltage at the input terminal, stops a charging operation, and instructs to switch between the third and fourth MOS transistors and start a boost operation.

16. A semiconductor integrated circuit comprising a boost converter having:
an input terminal powered via an inductor;
an output terminal for power output;
a first MOS transistor with one end coupled to the input terminal and another end coupled to a circuit ground;
an n-channel second MOS transistor with one end coupled to the input terminal and another end coupled to the output terminal;
a boost control circuit for controlling a boost operation and a boost disabling state, wherein the boost operation complementarily controls switching between the first and second MOS transistors based on a voltage of the output terminal to generate a specified voltage at the output terminal; and wherein the boost disabling state turns off the first and second MOS transistors;
a p-channel third MOS transistor coupled between a substrate of the second MOS transistor and an electrode toward the input terminal of the second MOS transistor;
a p-channel fourth MOS transistor coupled between a substrate of the second MOS transistor and an electrode toward the output terminal of the second MOS transistor;
a substrate bias switch control circuit that turns on the third MOS transistor and turns off the fourth MOS transistor in the boost operation, turns off the third MOS transistor and turns on the fourth MOS transistor in the boost disabling state, and charges an electrode toward the output terminal of the second MOS transistor and switches between the third and fourth MOS transistors to start the boost operation from the boost disabling state.

17. The semiconductor integrated circuit according to claim 16,
wherein a substrate is coupled to the second, third, and fourth MOS transistors in common.

18. The semiconductor integrated circuit according to claim 17,
wherein the substrate bias switch control circuit includes:
a charging circuit that charges an output terminal in response to an external instruction for starting the boost operation from the boost disabling state; and
a detection circuit that detects a match between a voltage at the output terminal and a voltage at the input terminal, stops a charging operation, and instructs to switch between the third and fourth MOS transistors and start a boost operation.

* * * * *